J. W. DEARSLEY.
MOLDING MACHINE.
APPLICATION FILED APR. 8, 1919.
1,318,849.
Patented Oct. 14, 1919.
2 SHEETS—SHEET 1.
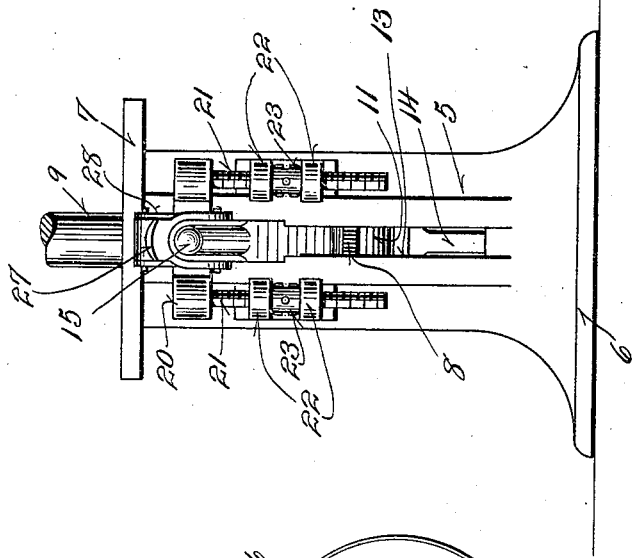
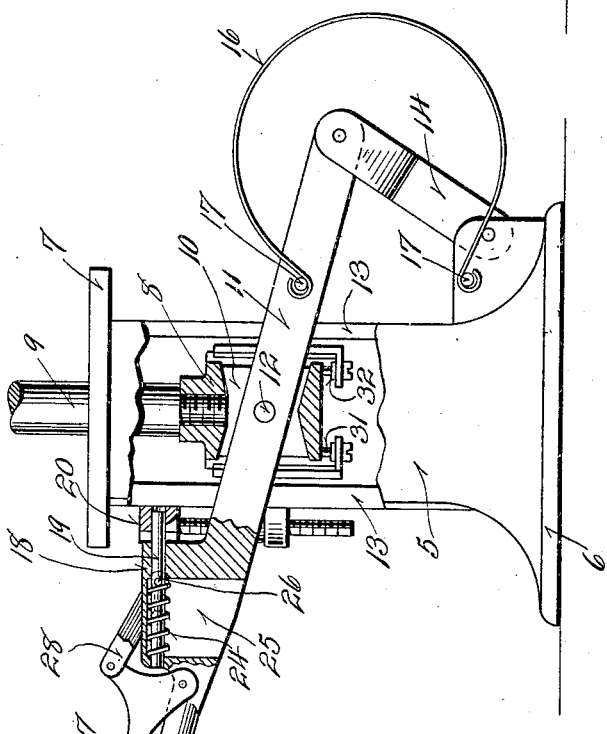
WITNESSES:
T. P. Britt
INVENTOR
John W. Dearsley
BY
Young & Young
ATTORNEYS J. W. DEARSLEY.
MOLDING MACHINE.
APPLICATION FILED APR. 8, 1919.
1,318,849.
Patented Oct. 14, 1919.
2 SHEETS—SHEET 2.
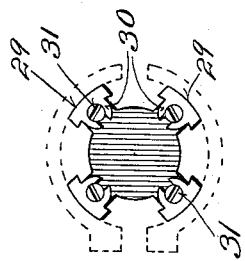
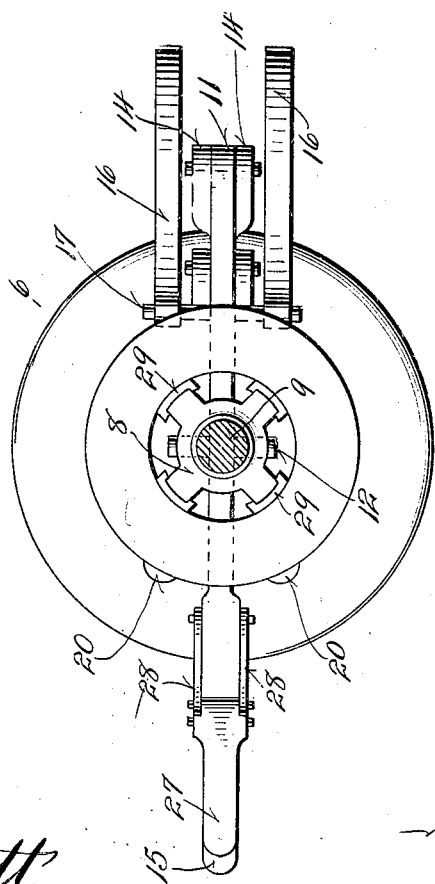

UNITED STATES PATENT OFFICE.

JOHN W. DEARSLEY, OF RACINE, WISCONSIN.

MOLDING-MACHINE.

1,318,849.  Specification of Letters Patent.  Patented Oct. 14, 1919.

Application filed April 8, 1919. Serial No. 288,606.

*To all whom it may concern:*

Be it known that I, JOHN W. DEARSLEY, a citizen of the United States, and resident of Racine, in the county of Racine and State of Wisconsin, have invented certain new and useful Improvements in Molding-Machines; and I do hereby declare that the following is a full, clear, and exact description thereof.

My invention relates to new and useful improvements in molding machines, more particularly of the type shown in Patent No. 735,347, issued to me August the 4th, 1903, and wherein there is provided a pattern carrying member vertically movable in a support standard and provided with means for effecting its vertical movement within predetermined variable limits.

It is in general the object of my invention to simplify and otherwise improve the structure and to increase the efficiency and convenience of operation and adjustment of machines of this character.

It is more particularly my object to provide an improved lifting lever arrangement for the movable pattern member, whereby a more direct lifting action is procured.

A further detailed object resides in the provision of a readily adjustable means for determining the operative stroke of the pattern carrying member, said means being carried wholly by the support standard.

With the above and other objects and advantages in view, my invention resides in the novel combinations, formation and arrangement of parts hereinafter more fully described and particularly pointed out in the appended claims.

In the accompanying drawings:

Figure 1 is a view partly in section and partly in side elevation of a molding machine embodying my invention.

Fig. 2 is an end view of the structure shown in Fig. 1.

Fig. 3 is a plan view of the structure shown in the foregoing figures.

Fig. 4 is a detail bottom view of the shifting head.

Referring now more particularly to the drawings, 5 designates the usual tubular support standard, which has its lower portion flared to form a base 6 and which has its upper end horizontally flared to form a table 7, the mold forming portions of the machine which are carried on this table forming no part of the present invention and being hence not shown.

As in my aforementioned patent, a shifting head block or spider 8 is vertically slidable within the standard, and mounts a pattern shaft 9 which has its lower end reduced and threaded in the head block. In the present structure, the shifting head block is provided with a transverse passage way 10 receiving the intermediate portion of a straight main lever 11 which is pivotally connected with the block by a pin 12 passed through the lever and block, said lever being extended through vertical slots 13 in diametrically opposed portions of the standard. One end of the lever is pivoted in the usual manner in the bifurcated upper end of a rock link 14 pivoted on the base 6. The other end of the lever terminates in a handle 15 which is grasped to swing the lever upwardly and thus impart a direct lifting action to the shifting head 8. The usual compensating springs 16, which are arcuate in shape to extend through the major arc of a circle, have their ends secured to pins 17 on the lever and base respectively adjacent the pivoted end portion of the lever.

To adjustably limit the upward movement of the pattern shifting head 8, and to hold the head at such limit of movement, an upwardly projecting enlargement 18 is formed on the handle end portion of the lever and slidably mounts a latch bolt 19 which has one end engageable in the socket of a keeper bar 20 which is vertically adjustable at the adjacent side of the support standard. This bar is carried by screw shafts 21 depending from its end portions, and each slidable in a pair of lugs 22 projecting from the standard, an adjusting nut 23 being threaded on each screw shaft between the pair of lugs whereby to readily vary the elevation of the keeper bar, and consequently vary the height at which the pattern shifting head will be held. The latch bar is resiliently urged to engaging position by a spring 24 coiled therein within the enlargement 18, said spring being disposed in a chamber 25 of said enlargement which is open at the bottom of the lever to permit ready assembly of parts, one end of the spring bearing against the rear end of the chamber while the other end of the spring bears against a pin 26 which is transversely passed through the latch bolt and through the slots in sides of the enlargement 18. Retraction of the latch bolt is procured by a grip lever 27 pivoted to the main lever adjacent the handle 15 and connected by links 28 with the projected ends of the stop pin 26. The keeper bar is beveled under its socket to provide for automatic engagement of the latch bar therein upon upward movement of the main lever, and the engagement of the latch bar with its socket forms a stop limiting upward movement of the lever, this limit being adjustable as heretofore explained. The pattern shifting head 8 is provided with radial spider projections which engage in the channeled inner sides of wear-shoes 29 in slidable bearing engagement with the wall of the standard. These shoes are detachably secured to the head by inwardly extending lugs 30 on their lower ends below the head, said lugs being slotted radially of the head to receive the shanks of screws 31 engaged in the bottom of the head, the lugs being confined between the heads of the screws and collars 32 thereon adjacent the heads. The wear shoes are thus readily replaceable.

By the aforedescribed features of construction, I have provided exceedingly simple and efficient means for shifting the pattern of a molding machine, and by extending the lifting lever directly through the support standard, a direct application of lifting force to the head 8 is effected.

While I have shown and described a preferred embodiment of my invention, it will be appreciated that various changes and modifications of structure may be employed to meet differing conditions of use and manufacture without departing in any manner from the spirit of my invention as expressed in the appended claims.

What is claimed is:

1. In a machine of the class described, the combination of a tubular support standard provided with vertical slots, a pattern shifting head slidable in the standard and a lifting lever extending through the slots of the standard and pivotally connected with the said shifting head.

2. In a machine of the class described, the combination of a tubular support standard provided with vertical diametrically opposed slots, a pattern shifting head slidable in the standard and provided with a transverse passage way registering with the slots of the standard, a lifting lever extending through the slots of the standard and the passage way of the shifting head, and a pivot pin passed through said head and lever.

3. In a machine of the class described, a tubular support standard, a pattern shifting head slidably carried by said standard, a lifting lever pivotally connected with the head, a vertically adjustable keeper member on the standard, and a latch member on the lever engageable with said keeper member.

4. In a machine of the class described, a support standard, a pattern shifting head slidably carried by the standard, a lifting lever pivotally connected with the head, guide lugs on the standard, screw shafts passed through said lugs, means associated with the shaft and lugs for vertically adjusting the shafts and keeper bar carried by the shafts, and a latch member on the lever engageable with the keeper bar.

5. In a machine of the class described, the combination of a tubular support standard provided with vertical slots, a pattern shifting head slidable in the standard, a lifting lever extending through the slots of the standard and pivotally connected with the said shifting head, a vertically adjustable keeper bar extending transversely across the upper portion of one of the slots of the standard, and a latch member engageable with said keeper member.

6. In a machine of the class described, a tubular support standard, a pattern shifting head movable in the standard, radial projections on the head, wear shoes engageable with the inner surface of the standard and having their inner portions channeled to receive the projections of the head, inwardly extending radially slotted lugs on the shoes and securing screws engaged in the slots of the lugs and threaded in the head.

In testimony that I claim the foregoing I have hereunto set my hand at Racine, in the county of Racine and State of Wisconsin.

JOHN W. DEARSLEY.

Copies of this patent may be obtained for five cents each, by addressing the "Commissioner of Patents, Washington, D. C."